US012794836B2

(12) United States Patent
Sathya et al.

(10) Patent No.: US 12,794,836 B2
(45) Date of Patent: Nov. 10, 2026

(54) TECHNOLOGICAL COLLABORATION TOOL FACILITATING PEER HELP AND IN-PERSON ASSISTANCE IN FIELD SERVICES

(71) Applicant: Oracle International Corporation, Redwood Shores, CA (US)

(72) Inventors: Abhijith Sathya, Thiruvananthapuram (IN); Prasad Nair, Thiruvananthapuram (IN)

(73) Assignee: ORACLE INTERNATIONAL CORPORATION, Redwoodshores, CA (US)

( * ) Notice: Subject to any disclaimer, the term of this patent is extended or adjusted under 35 U.S.C. 154(b) by 128 days.

(21) Appl. No.: 18/761,374

(22) Filed: Jul. 2, 2024

(65) Prior Publication Data

US 2025/0343771 A1 Nov. 6, 2025

(30) Foreign Application Priority Data

May 3, 2024 (IN) ............................ 202441035237

(51) Int. Cl.
*H04L 51/04* (2022.01)
*G06N 20/00* (2019.01)

(52) U.S. Cl.
CPC ............ *H04L 51/04* (2013.01); *G06N 20/00* (2019.01)

(58) Field of Classification Search
CPC ................................ H04L 51/04; G06N 20/00
See application file for complete search history.

(56) References Cited

U.S. PATENT DOCUMENTS 11,113,987 B1 * 9/2021 Jaggers .................... G09B 5/04

OTHER PUBLICATIONS

How is activity duration calculated, https://docs.oracle.com/en/cloud/saas/field-service/faqaa/c-how-activity-duration-is-calculated.html, downloaded circa Jun. 2024, 04 Pages.

* cited by examiner

*Primary Examiner* — Suraj M Joshi
(74) *Attorney, Agent, or Firm* — IPHORIZONS PLLC; Narendra Reddy Thappeta

(57) ABSTRACT

An aspect of the present disclosure provides a technological collaboration tool facilitating peer help and in-person assistance in field services. A system (executing the tool) obtains a training data containing characteristics of multiple technicians and characteristics of activities completed by each technician in resolving prior issues. trains a machine learning (ML) model based on the training data, the ML model thereafter operable to determine a proficiency level of technicians in helping with a given activity. Upon receiving, from a technician, a request for help with an activity, the system determines, based on the ML model and the activity, a set of technicians capable of helping with the activity. The system then creates a group chat including the technician and the set of technicians as a response to the request.

17 Claims, 19 Drawing Sheets

410

| Property | Description | Example |
|---|---|---|
| Activity Type | Defines the type of activity being done | Install, Deinstall, Repair |
| Activity Work Skill | Defines the skills required to perform a given activity | Installer, Calibrator, Residential |
| Activity Work Zone | Defines the area where the activity needs to be done | Heathrow, Geneva, Sanford |
| Customer Id | The id of the customer for whom the activity is being done | 121, 342 |
| Inventory List | Type of all inventories associated with this activity | 12:15:21, 35, 12:21 |
| Activity Description Keywords | Important Keywords extracted from Activity Description text | Heater, Not Working, Big Sound |

420

| Property | Description | Example |
|---|---|---|
| Resource Id | Unique Identifier for the field technician | 3321, 3123 |
| Resource Work skill | List of different skills (with level) that the given field technician has | Installer (80) : Callibrator (90) |
| Resource Work Zone | Area where the given technician works | Heathrow, Sanford |

430

| Property | Description | Example |
|---|---|---|
| Resource Id | Unique Identifier for the field technician | 3321, 3123 |
| Recent Activity Types | List of Activity Types for recently completed activities along with its count | Install 20:Service 30 |
| Recent Work skill | List of Work Skills for recently completed activities along with its count | Installer 20:Residential 30 |
| Recent Work Zone | List of Work Zones for recently completed activities along with its count | Sanford 10:Heathrow 40 |

FIG. 4A

440

| Property | Description | Example |
|---|---|---|
| Activity Duration | Time taken to complete the activity at the customer site in minutes | 60, 90 |
| Visits Count | No of visits done at the customer site to complete the activity | 1, 2, 5 |
| Customer Rating | Rating provided by customer for the work done (out of 5) | 5, 3, 4 |
| Peer Help Count | Count of peer help requests successfully complete in last 6 months | 10, 20, 30 |

450

| Activity Duration | Visits Count | Customer Rating | Peer Help Count | Proficiency |
|---|---|---|---|---|
| 60 | 1 | 5 | 30 | 0.9 |
| 60 | 4 | 3 | 10 | 0.5 |

460

| Activity Type | Activity Work Skill | Activity Work Zone | Customer ID | Inventory List | Activity Description Keywords | Resource ID | Resource work skill | Resource work zone | Recent Activity Types | Recent Work Skills | Recent Work Zones | Proficiency |
|---|---|---|---|---|---|---|---|---|---|---|---|---|
| Install | Installer | heathrow | 1212 | 12:15:21 | Install Cooler | 1001 | Installer (80) : Callibrator (10) | Sanford: Heathrow | Install_20: Repair_30 | Installer_20: Callibrator_30 | Sanford_10: Heathrow_40 | 0.9 |
| Repair | Callibrator | Sanford | 2344 | 35 | Loud Sound: No Cooling | 1002 | Installer (60) : Callibrator (10) | Sanford: Heathrow | Install_25 | Installer_25 | Heathrow_25 | 0.5 |

*FIG. 4B*

510

| KeyId | KeyValue |
| --- | --- |
| 1 | Install |
| 2 | Deinstall |
| 3 | Repair |

520

| Id | ActivityKeyId | ResourceId | Proficiency |
| --- | --- | --- | --- |
| 1 | 1 | 1001 | 0.9 |
| 2 | 1 | 1002 | 0.6 |
| 3 | 1 | 1003 | 0.7 |
| 4 | 2 | 1001 | 0.7 |
| 5 | 2 | 1003 | 0.6 |
| 6 | 3 | 1001 | 0.8 |

*FIG. 5*

650

| Activity Type | Activity Work Skill | Activity Work Zone | Customer Id | Customer Id | Inventory List | Activity Description Keywords | Resource Id | Resource Work Skill | Resource Work Zone | Recent Activity Types | Recent Work Skills | Recent Work Zones |
|---|---|---|---|---|---|---|---|---|---|---|---|---|
| Install | Installer | Heathrow | 1212 | 12:15:21 | 12:15:21 | Install Cooler | 1001 | Installer (80) : Calibrator (10) | Sanford-Heathrow | Install_30:repair_20 | Install_30:Calibrator_20 | Sanford_25:Heathrow_25 |
| Install | Installer | Heathrow | 1212 | 12:15:21 | 12:15:21 | Install Cooler | 1002 | Installer (70) : Residential (30) | Geneva:Heathrow | Install_35 | Installer_35 | Heathrow_35 |
| Install | Installer | Heathrow | 1212 | 12:15:21 | 12:15:21 | Install Cooler | 1003 | Installer (60) : Calibrator (10) | Sanford-Heathrow | Repair_15 | Calibrator_15 | Sanford_15 |

660

| Resource Id | Proficiency |
|---|---|
| 1001 | 0.9 |
| 1002 | 0.6 |
| 1003 | 0.4 |

FIG. 6B

TECHNOLOGICAL COLLABORATION TOOL FACILITATING PEER HELP AND IN-PERSON ASSISTANCE IN FIELD SERVICES

PRIORITY CLAIM

The instant patent application is related to and claims priority from the co-pending India provisional patent application entitled, "AUTOMATIC PEER HELP AND ASSISTANCE VIA COLLABORATION", Serial No.: 202441035237, Filed: 3 May 2024, which is incorporated in its entirety herewith.

Background of the Disclosure

Technical Field

The present disclosure relates to computing systems and more specifically to a technological collaboration tool facilitating peer help and in-person assistance in field services.

Related Art

Field services refer to a service delivery model in which persons such as technicians typically visit customer sites to attend to various issues. A technician may perform tasks such as repairing, configuring, performing maintenance, etc., at the customer site, as is well known in the relevant arts.

There may be scenarios in which a technician him/herself may require support in performing a requisite task while resolving an issue. Such support may be in the form of peer help, in which one or more technicians at remote locations may collaborate with the technician using communication technologies (e.g., messaging, voice or video call) in addressing the issue at hand. Alternatively, support may be in the form of another technician who would physically present her/himself at the customer site (referred to as 'in-person assistance').

Aspects of the present disclosure are directed to a technological collaboration tool facilitating peer help and in-person assistance in field services.

BRIEF DESCRIPTION OF THE DRAWINGS

Example embodiments of the present disclosure will be described with reference to the accompanying drawings briefly described below.

FIGS. 4A-4B depicts data used in a regression machine learning (ML) approach in one embodiment.

FIG. 5 depicts data used in a key based natural learning approach in one embodiment.

FIGS. 6A and 6B together illustrate the manner in which a list of peer technicians for a given activity is determined in a regression machine learning (ML) approach in one embodiment.

DETAILED DESCRIPTION OF THE EMBODIMENTS OF THE DISCLOSURE

1. Overview

Figure 1:
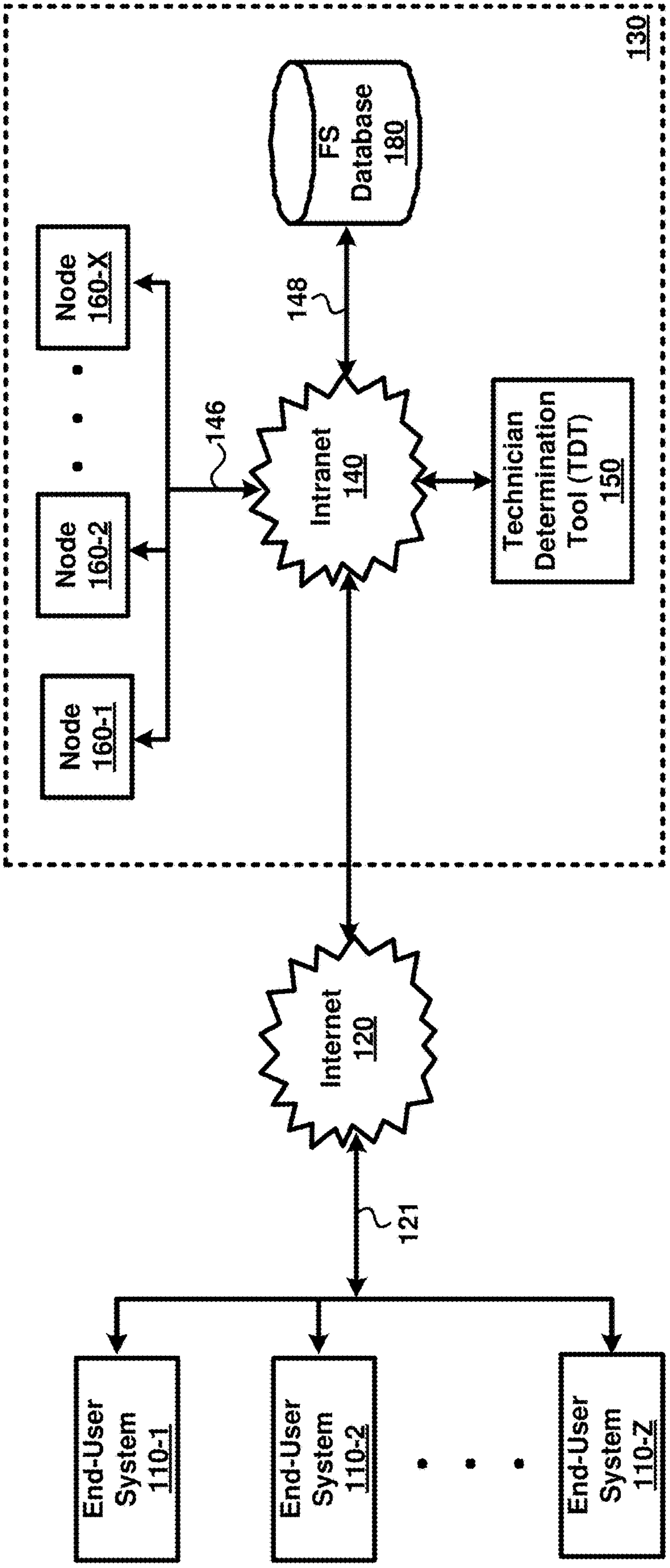
FIG. 1 is a block diagram illustrating an example environment in which several aspects of the present disclosure can be implemented.

An aspect of the present disclosure provides a technological collaboration tool facilitating peer help and in-person assistance in field services. A system (executing the tool) obtains a training data containing characteristics of multiple technicians and characteristics of activities completed by each technician in resolving prior issues. trains a machine learning (ML) model based on the training data, the ML model thereafter operable to determine a proficiency level of technicians in helping with a given activity. Upon receiving, from a technician, a request for help with an activity, the system determines, based on the ML model and the activity, a set of technicians capable of helping with the activity. The system then creates a group chat including the technician and the set of technicians as a response to the request.

According to another aspect of the present disclosure, for creating the group chat, the system sends a request to a collaboration service to create the group chat including the technician and the set of technicians.

According to one more aspect of the present disclosure, the ML model employs a regression ML approach. For determining (noted above), the system applies the ML model to the (received) activity to identify for each technician, a proficiency score indicating the proficiency level of the technician in helping with the received activity and then includes technicians having the proficiency score above a threshold in the set of technicians.

According to one aspect of the present disclosure, for the regression ML approach, the characteristics of each technician includes one or more of a work skill of the technician, a work zone where the technician works, a list of activity types for recent activities completed by the technician and corresponding counts, a list of work skills used for the recent activities and corresponding counts, and a list of work zones for the recent activities and corresponding counts. The characteristics of each activity includes one or more of an activity type, an activity work skill specifying work skills required to perform the activity, an activity work zone specifying a work zone where the activity is to be performed, a customer associated with the activity, an inventory list specifying the inventories associated with the activity and activity description keywords extracted from a description of the activity.

According to yet another aspect of the present disclosure, the ML model employs a key based natural learning approach. The system calculates, after the training (noted above) by using the ML model, a proficiency score for each technician indicating the proficiency level of the technician in helping with a corresponding activity and stores, in a data store, the corresponding activity against a combination of the technician and the proficiency score. For determining (noted above), the system retrieves from the data store, a set of combinations stored corresponding to the activity and identifies a subset of combinations having the proficiency score above a threshold, with the set of technicians comprising the technicians in the subset of combinations.

According to an aspect of the present disclosure, upon receiving another request for in-person assistance for the activity, the system identifies a first subset of technicians contained in the set of technicians capable of providing the in-person assistance and sends an in-person assistance request to each technician of the first subset of technicians. The system checks, for a preconfigured duration, whether an acceptance to the in-person assistance request has been received from any of the first subset of technicians. If no acceptance has been received in the pre-configured duration, the system identifies a second subset of technician contained in the set of technicians capable of providing the in-person assistance and sends the in-person assistance request to each technician of the second subset of technicians. The receipt of the acceptance from any of the first subset of technicians and the second subset of technicians is forwarded as a response to the second request.

According to one more aspect of the present disclosure, the in-person assistance request contains details of the activity, a specific query entered by the technician, a location of the activity, an estimated time to complete work along with to and from travel, an available idle time in route, and an accept button to indicate acceptance, and a reject button to indicate non-acceptance.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end-user systems 110-1 through 110-Z (Z representing any natural number), Internet 120, and computing infrastructure 130. Computing infrastructure 130 in turn is shown containing intranet 140, nodes 160-1 through 160-X (X representing any natural number), TDT (technician determination tool) 150 and FS (field service) database 180. The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All of nodes 160 of computing infrastructure 130 are connected via intranet 140. Internet 120 extends the connectivity of these (and other systems of the computing infrastructure) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Some of nodes 160 may be implemented as corresponding data stores. Each data store amd also FS database 180 represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system and TDT 150 represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

In one embodiment, a technician deployed as part of field services uses one of end-user systems 110 to seek assistance from other technicians (using other end-user systems 110). As noted in the Background section, the request for assistance may be one of peer help (remote help from other technicians) or in-person assistance.

Technician determination tool (TDT) 150, provided according to several aspects of the present disclosure, facilitates peer help and in-person assistance in field services. Though shown implemented as a separate system, in alternative embodiments, TDT 150 may be implemented on one of nodes 160 in computing infrastructure 130. The manner in which TDT 150 facilitates peer help and in-person assistance in field services is described below with examples.

3. Facilitating Peer Help and In-Person Assistance in Field Services

Figure 2:
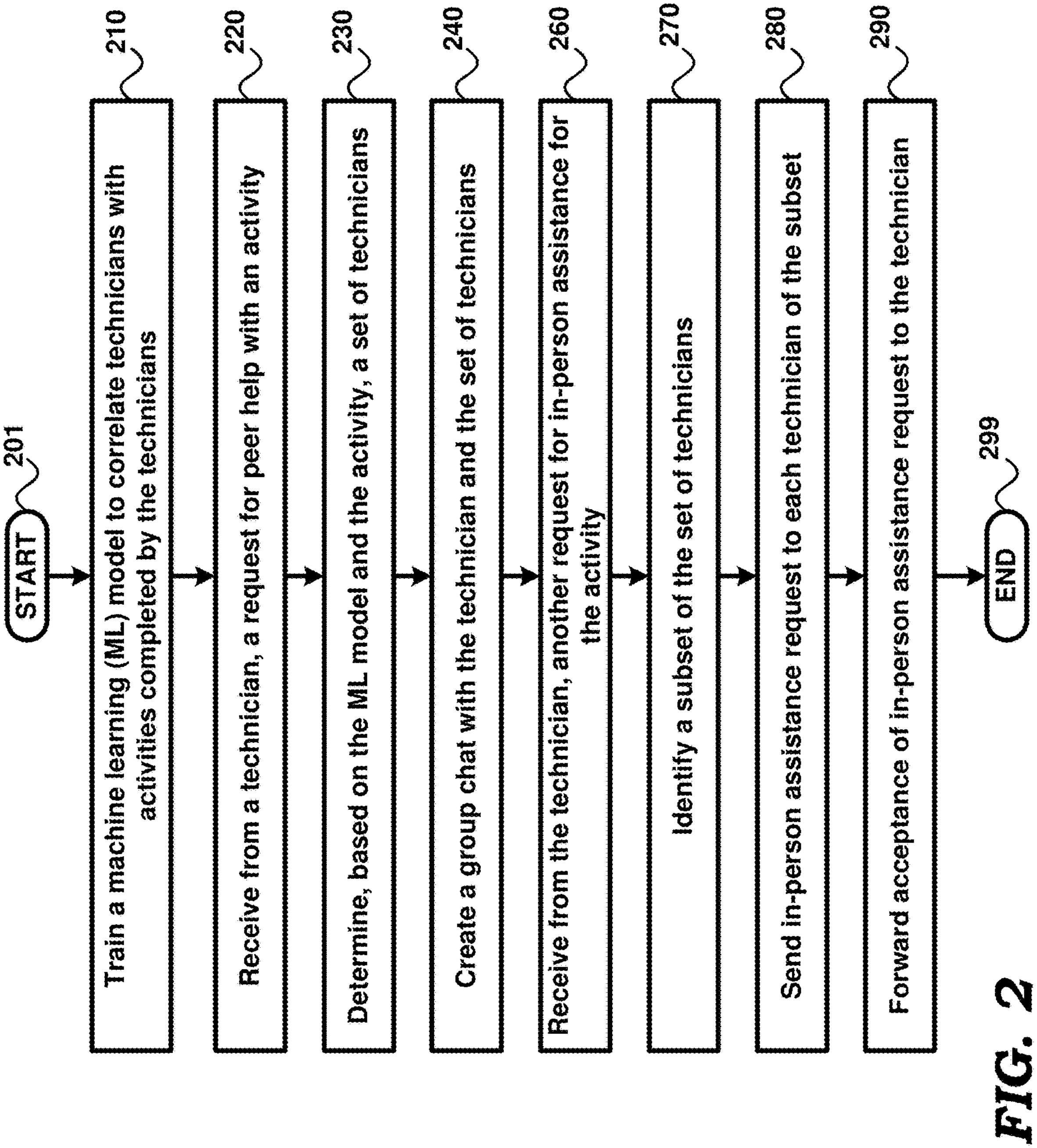
FIG. 2 is a flow chart illustrating the manner in which a technological collaboration tool facilitating support in field services is provided according to aspects of the present disclosure.

FIG. 2 is a flow chart illustrating the manner in which a technological collaboration tool facilitating support in field services is provided according to aspects of the present disclosure. The flowchart is described with respect to the systems of FIG. 1 in particular TDT 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, TDT 150 trains a machine learning (ML) model to correlate technicians with activities completed by the technicians. In particular, TDT 150 obtains a training data containing characteristics of multiple technicians and characteristics of activities completed by each technician in resolving prior issues. The ML model is trained using the training data to determine a proficiency level of a technician in helping with a given activity.

In step 220, TDT 150 receives from a technician, a request for peer help with an activity. The request may be received from one of end-user systems 110 used by the technician. The request may be initiated by the technician upon requiring clarifications/help with the performance of the activity (that may be part of resolution of an issue).

In step 230, TDT 150 determines, based on the ML model and the activity, a set of technicians capable of helping with the activity. The determination may be performed consistent with the manner in which the ML model is trained. According to an aspect, when the ML model employs a regression ML approach, TDT 150 applies the ML model to the (received) activity to identify for each technician, a proficiency score indicating the proficiency level of the technician in helping with the activity. The term "applying" entails providing the activity as inputs to the ML model and receiving the proficiency scores of the technicians as the outputs of the ML model. TDT 150 then includes technicians having the proficiency score above a threshold in the set of technicians.

According to another aspect, when the ML model employs a key based natural learning approach, TDT 150 calculates (using the ML model) a proficiency score indicating the proficiency level of each technician in helping with a corresponding activity and stores, in a data store (such as FS database 180), the corresponding activity against a combination of the technician and the proficiency score. For the determination, TDT 150 retrieves from the data store (FS database 180), a set of combinations stored corresponding to the activity and identifies a subset of combinations having the proficiency score above a threshold, with the technicians in the subset of combinations forming the set of technicians.

In step 240, TDT 150 creates a group chat with the technician and the set of technicians as a response to the request of step 220. The creation of the group chat facilitates the technician to discuss the clarifications required. accept help related to the activity, etc. with the determined set of technicians and accordingly obtain peer help from the other technicians. According to an aspect, TDT 150 sends a request to a collaboration service (executing in one of nodes 160) to create the group chat including the technician and the set of technicians.

In step 260, TDT 150 receives from the technician, another request for in-person assistance for the (same) activity. The request may also be received from the same end-user system 110, and is typically received if the technician is unable to obtain the desired clarifications/help from the set of technicians via the group chat created earlier. However, in alternative embodiments, the in-person request may be received first, without a prior request for peer help.

In step 270, TDT 150 identifies a subset of the set of technicians based on one or more parameters such as the proximity of the technicians to the activity location, the amount of idle time available in the route of the technicians, technicians who have worked on the given asset (customer site) before, etc.

In step 280, TDT 150 sends in-person assistance request to each technician of the subset. The in-person assistance request contains details of the activity, a specific query entered by the technician, a location of the activity, an estimated time to complete work along with to and from travel, an available idle time in route, and an accept button to indicate acceptance, and a reject button to indicate non-acceptance.

In step 290, TDT 150 forwards acceptance of any of the in-person assistance requests (sent to the subset of technicians) to the (requesting) technician as a response to the request of step 260. According to an aspect, TDT 150 checks, for a preconfigured duration, whether an acceptance to the in-person assistance request has been received from any of the subset of technicians (noted in step 270). If no acceptance has been received in the pre-configured duration, TDT 150 identifies a second subset of technicians contained in the set of technicians and performs the steps of 280 and 290 with respect to the second subset of technicians. Control then passes to step 299, where the flowchart ends.

Thus, technician determination tool 150 along with a collaboration service may be viewed as forming a technological collaboration tool facilitating support (peer help and in-person assistance) in field services. The manner in which TDT 150 provides several aspects of the present disclosure according to the steps of FIG. 2 is described below with examples.

4. Illustrative Example

FIGS. 3, 4A-4B, 6, 6A-6C, 7 and 8A-8H together illustrate the manner in which a technological collaboration tool facilitating support in field services is provided in one embodiment.

Figure 3:
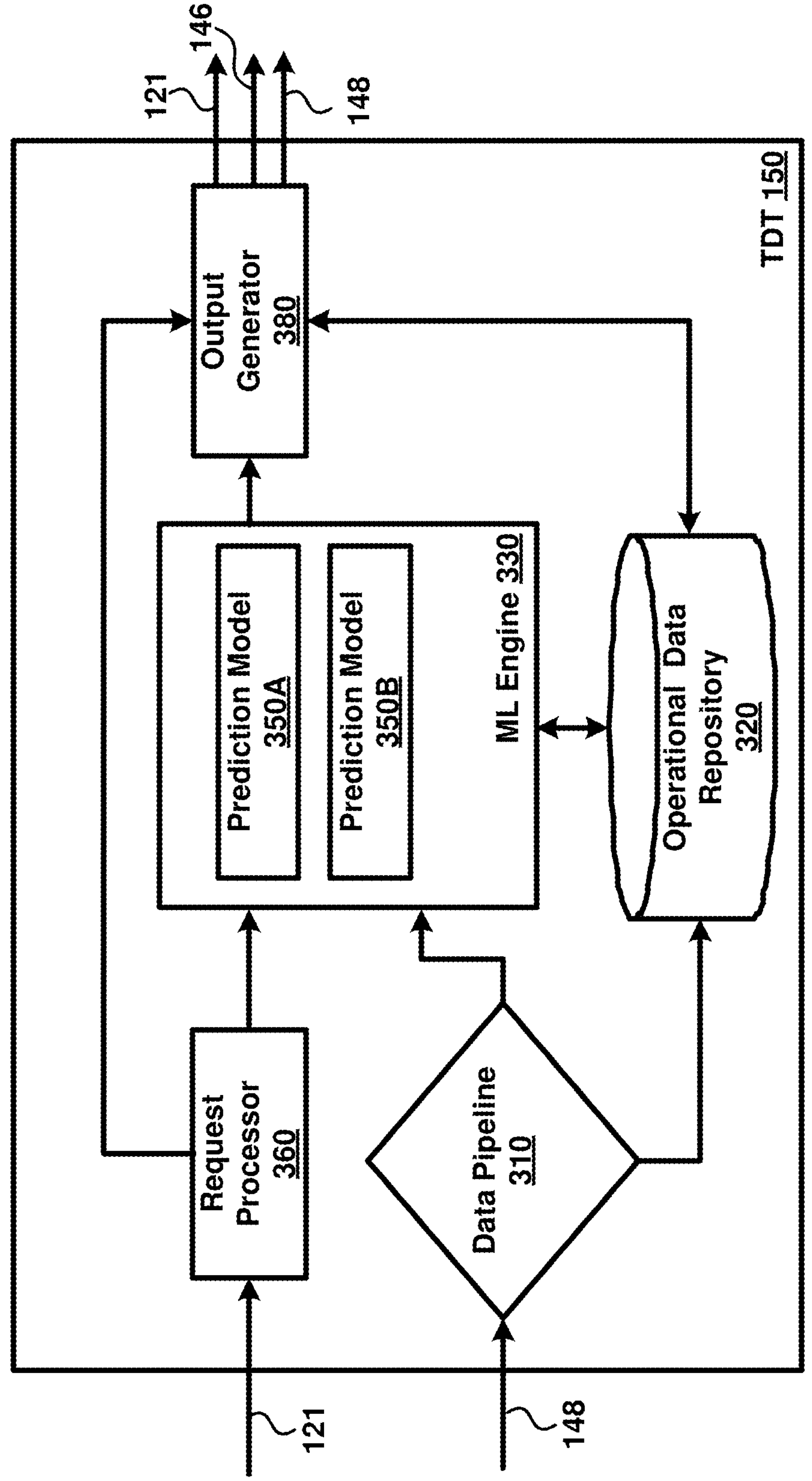
FIG. 3 is a block diagram depicting an implementation of a technician determination tool in one embodiment.

FIG. 3 is a block diagram depicting an implementation of a technician determination tool (150) in one embodiment. The block diagram is shown containing data pipeline 310, operational data repository (ODR) 320 and ML engine 330 (in turn, shown containing prediction models 350A and 350B), request processor 360 and output generator 380. Each of the blocks is described in detail below.

Data pipeline 310 receives (via path 148) from FS database 180, the characteristics of multiple technicians and characteristics of activities completed by each technician in resolving prior issues. Data pipeline 310 may then perform any desired pre-processing actions such as normalization, identifying keywords using natural language processing (NLP)/large language models (LLM), etc. to the received data prior to storing the pre-processed data in ODR 320.

ODR 420 represents a data store that maintains portions of technicians and activity data. Though shown internal to TDT 150, in alternative embodiments, ODR 320 may be implemented external to TDT 150, for example, in one or more of nodes 160. Data pipeline 310 also forwards the resource usages data to ML engine 330.

ML engine 330 generates and maintains various models that correlate the data received from data pipeline 310. The models may be generated using any machine learning or deep learning approaches, either supervised or unsupervised. Examples of machine learning (ML) approaches are KNN (K Nearest Neighbor), Decision Tree, etc., while deep learning approaches are Multilayer Perceptron (MLP), Convolutional Neural Networks (CNN), Long short-term memory networks (LSTM) etc. Various other machine learning approaches can be employed, as will be apparent to skilled practitioners, by reading the disclosure provided herein.

Each of prediction models 350A and 350B correlates the characteristics of technicians to the characteristics of activities, specifically, to determine for each technician, a proficiency score indicating the proficiency of the technician in the performance of a corresponding activity. In the following description, it is assumed that prediction model 350A is a regression ML model that employs a regression ML approach, while prediction model 350B is a key based natural learning model that employs a key based learning approach. The models 350A/350B are trained using the data received from data pipeline 310, and thereafter used to predict a proficiency score for each technician for a given activity.

Request processor 360 receives (via path 121) requests for peer help/in-person assistance for desired activities, performs any required pre-processing (those noted above) and forwards the details of the pre-processed request as inputs to prediction models 350A/350B, thereby causing prediction models 350A/350B to generate appropriate outputs (such as proficiency scores). Though not shown, request processor 360 may interact with external services (executing on nodes 160) for the performing of the pre-processing actions noted above. Request processor 360 may also forward the requests to output generator 380 directly.

Output generator 380 receives the outputs of prediction models 350A-350B and generates outputs to be sent to external systems. For example, in response to a peer help request, after receiving proficiency scores of technicians for a given activity as outputs of prediction models 350A/350B, output generator 380 includes technicians having proficiency scores above a threshold in the set of technicians capable of helping with the given activity, and then sends (via path 146) a request to a collaboration service (executing in one of nodes 160) to create a group chat including the technician (sending the peer help request) and the output set of technicians.

In another example, when prediction models 350A/350B are used to calculate a technical proficiency score for each technician in the performance of a corresponding activity, output generator 380 stores (via path 148) the corresponding activity against a combination of the technician and the proficiency score in FS database 180. In response to receiving a peer help request for an activity forwarded by request processor 360, output generator 380 retrieves from ODS 320 (which contains data received from FS database 180), a set of combinations corresponding to the activity, identifies a subset of combinations having the proficiency score above a threshold, and sends (via path 121) the technicians in the subset of combinations as a response to the peer help request.

Thus, TDT 150 is implemented to facilitate peer help and in-person assistance in field services. The high-level implementation of TDT 150 may be split into three-calculating technician proficiency, requesting peer help and requesting in-person assistance, which are described below with examples in subsequent sections.

5. Calculating Technician Proficiency

TDT 150 is designed to first find the proficiency of technicians across different types of activities. Such learning may be used later to find the correct peer technicians for a given activity. In one embodiment, the technique to find the proficiency of technicians across different activities can be implemented using 2 approaches—a regression machine learning approach and a key based natural learning approach. Each of the approaches is described in detail below.

FIGS. 4A-4B depicts data used in a regression machine learning (ML) approach in one embodiment. Broadly, a regression ML model (350A) is designed to predict the proficiency of field technicians in doing onsite activities of different types. The training data mainly has the properties of activities and properties of field technicians.

FIG. 4A depicts the inputs (independent variables of the ML model) consisting of properties of activities, properties of field technicians and recent history of activities done by the field technicians. Properties of activities contain different details of an activity—(1) Default Properties (fields) that are properties inbuilt in the system and that are present for all the customers, and (2) Custom Properties which are customer configured properties and may be different for different customers.

In one embodiment, TDT 150 starts with all properties of all completed activities and later eliminates the properties that are not important using algorithms like Mutual Information Maximization, and Recursive Feature Extraction, as is well known. For properties like Activity Description and Activity Notes, which contain textual data, TDT 150 may use NLP/LLM techniques to extract important keywords (info). The extracted key words may be used for training instead of the whole textual data. Some of the important activity properties and their details are shown in table 410 of FIG. 4A.

Properties of field technicians (also referred to as resources) contain different details of the field technician, and may include default properties and custom properties. Some important resource properties and their details are shown in table 420 of FIG. 4A. Recent history of work done by field technicians contains details of the recent (e.g., past 6 months) activities successfully completed by the given technician. There may be cases where the technician has multiple skills and work zones assigned to him/her. But in the recent history he/she may be working on activities with only few skills and on few work zones from that list. It means that he/she, though eligible to do different kinds of work at different places, is not having experience on many of them. Accordingly, only the recent history is desirable to be used data in learning/training so that TDT 150 can identify resources/technicians who have recent experience with the required skills and working in the required area. Some of the details of the recent history of work are shown in table 430 of FIG. 4A. It may be noted that the count is added along with all parameters of recent work history to bring an aspect of the amount of recent experience into the learning/training. With such a feature, a technician with a higher count of specific parameter is given a proportionally higher proficiency score.

FIG. 4B depicts the outputs (dependent variables of the ML model) that are an indicator of the proficiency of the technician in doing a specific activity. There are mainly 3 parameters that contribute to proficiency score—Duration of activity, Number of visits to the customer location to complete the activity and Customer rating for the work. In addition, another parameter, namely, Peer help count may also be added. Some of the details of the output parameters are shown in table 440 of FIG. 4B. It may be noted that the peer help count is added to give higher proficiency for those technicians who are good in doing peer help.

It may be appreciated that there are different approaches for implementing a regression model with multiple output parameters. Some of the main approaches are Single-Output Transformation, Multi-Output Regression and Stacked Regression. In one embodiment described below, the regression ML model used in TDT 150 implements Single-Output Transformation.

In such an approach, multiple output parameters are transformed into a single parameter using a transformation function. In the current case, as the outputs are correlated, the use of a single transformation function can meaningfully transform the multiple parameters to a single value without losing information and model performance. Such an approach is also less complex compared to other approaches and may help in explainability and maintainability of the regression ML model.

A transformation function is designed to transform the multiple output parameters into a single output parameter that is indicative of the proficiency of a technician. To design a transformation function that incorporates all four output parameters (duration of activity, number of visits, customer rating, peer help assistance) into a single value, the relative importance of each parameter and their impact on the overall performance have to be considered. A high-level implementation for such a transformation function may have the following actions:

Normalize the Parameters—Normalize each parameter to ensure that they are on the same scale, which is important for combining them into a single value. Techniques like min-max scaling or z-score normalization may be used. In one embodiment, the min-max scaling is used.

Assign Weights—Assign weights to each parameter based on their impact on the proficiency. Since high customer rating and peer help assistance are desirable, they should have positive weights (e.g., 0.8 and 0.2 respectively). However, as less duration and fewer visits are less desirable, they should have a negative weight (e.g., −0.7 and −0.3 respectively). Also, the weights can be adjusted considering the importance of the parameter. For example, customer rating and duration may be given more importance (higher weight) than peer help assistance.

Combine Parameters—Combine the normalized parameters using the assigned weights. A linear combination is used, as the parameters are correlated. In alternative embodiments, other mathematical functions may be used if a more complex relationship between the parameters is needed to be modelled.

Adjust Range—Adjust the range of the combined value to ensure it falls within a suitable range. For example, the combined value may be scaled to be between 0 and 1 for easier interpretation.

An example output transformation to calculate a proficiency score corresponding to the four output parameters noted above is shown in table 450 of FIG. 4B.

The above noted inputs (independent variables) and outputs (dependent variables) may be combined to form the training data for the regression ML model. A sample training data provided to regression ML model (350A) is shown in table 460 of FIG. 4B. It should be noted that only the important properties are shown here for illustration. In actual implementations, there may be many more properties in the training data set due to the various custom properties defined by the customers. Furthermore, the target variable, proficiency may be obtained by transforming output parameters using any appropriate transformation function as explained above.

The description is continued with the manner in which technical proficiency is calculated when using a key based natural learning approach in one embodiment.

FIG. 5 depicts data used in a key based natural learning approach in one embodiment. Broadly, in the key based natural learning approach, a Natural Learning algorithm is implemented for learning the technician proficiencies. The technician proficiency is found based on past data using key based natural learning. In other words, the learning is based on a key, configured by the user, for grouping similar activities (e.g., Activity Type). TDT 150 (specifically prediction model 350B) learns the proficiency of field technicians for each value of the configured key (e.g., If the key is Activity Type, the system learns for each type of activity). The proficiency of technicians so calculated is stored back in FS database 180 (via output generator 380).

In one embodiment, the key for the natural learning approach is configured as Activity Type. An activity key dictionary table that stores different values of the configured key (Activity type in this example) is shown in table 510 of FIG. 5. A technician proficiency table storing the proficiency of technicians against different activity keys is shown in table 520 of FIG. 5. It should be noted that a key based natural learning is a ML technique well known in the relevant arts, and accordingly additional details of implementation are not included here for conciseness.

Thus, TDT 150 calculates a proficiency score for each field technician based on the properties of activities and properties of the field technicians. The description is continued with the manner in which TDT 150 facilitates requesting peer help according to an aspect of the present disclosure.

6. Requesting Peer Help

When a technician requests for peer help for a given activity, TDT 150 is designed to respond with a list of peer technicians who are most eligible to provide help in the given activity. The manner in which TDT 150 determines the list of peer technicians is different based on the approach used for calculating technician proficiency. The determination performed for each approach is described in detail below.

Figure 6A:
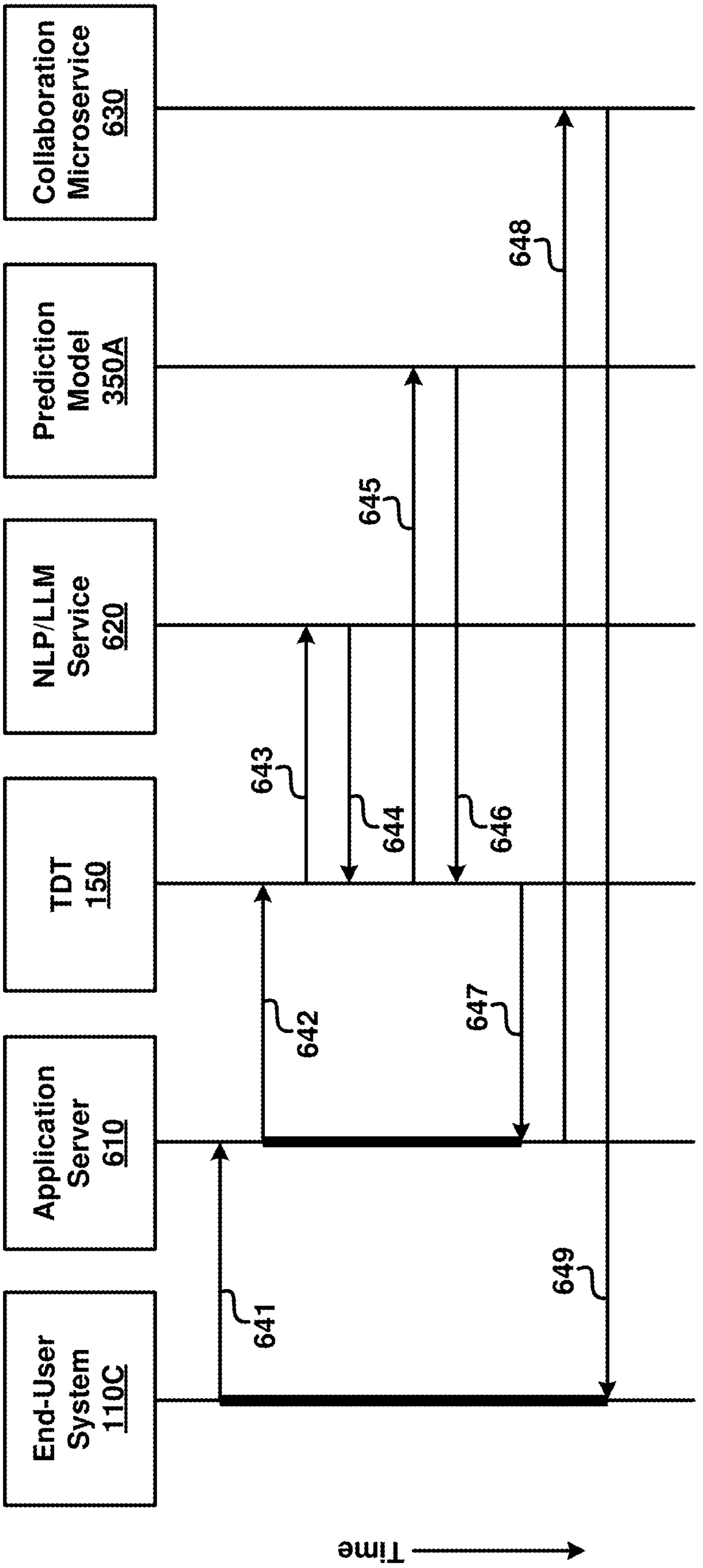

FIGS. 6A and 6B together illustrate the manner in which a list of peer technicians for a given activity is determined in a regression machine learning (ML) approach in one embodiment. In FIG. 6A, application server 610 represents a web/application server hosted on one of nodes 160, which operates as a front-end to user requests received from end-user systems 110. NLP/LLM service 620 represents an external service hosted on one of nodes 160, that is designed to receive text and extract and return one or more (important) keywords contained in the received text. Collaboration microservice 630 represents an external service hosted on one of nodes 160, that is designed to create group chats among two or more systems.

At 641, a peer help request for a given activity is initiated by a technician using end-user system 110C to application server 610. At 642, application server 610 sends a find request for finding a list of peer technicians for the given activity to TDT 150. The find request may include the properties of other field technicians. At 643, TDT 150 invokes NLP/LLM service 620 to extract key words from the text properties of the given activity (like Activity Description), and receives the extracted keys as a response at 644.

At 645, TDT 150 invokes/uses prediction model 350A (that employs a regression ML approach) with the details of the given activity, extracted keywords and resource properties. A sample input data used for invoking prediction model 350A is shown in table 650 of FIG. 6B. At 646, TDT 150 (in particular, output generator 380) receives the proficiency scores of the different technicians for the given activity. A sample output data generated by prediction model 350A is shown in table 660 of FIG. 6B.

From the proficiencies returned from the ML model, TDT 150 filters all technicians who have proficiency score above a configured threshold, and return the list of proficient technicians at 647. For example, if the configured threshold proficiency is 0.5, TDT 150 selects resources/technicians 1001 and 1002 as proficient technicians for the given activity and returns them in the response.

On receiving the list of proficient technicians, application server 610 may do one more filtering and select all the technicians who are (a) having chat visibility with the initiating technician in collaboration and (b) currently online in collaboration. At 648, application server 610 sends the filtered list of technicians to collaboration microservice 630 (chat service), which in turn creates (at 649) a group chat with all the identified peer technicians and the initiating technician who was seeking help. The initiating technician can chat and get his/her query cleared.

The description is continued with the manner in which peer help is requested when using a key based natural learning approach in one embodiment.

Figure 6C:
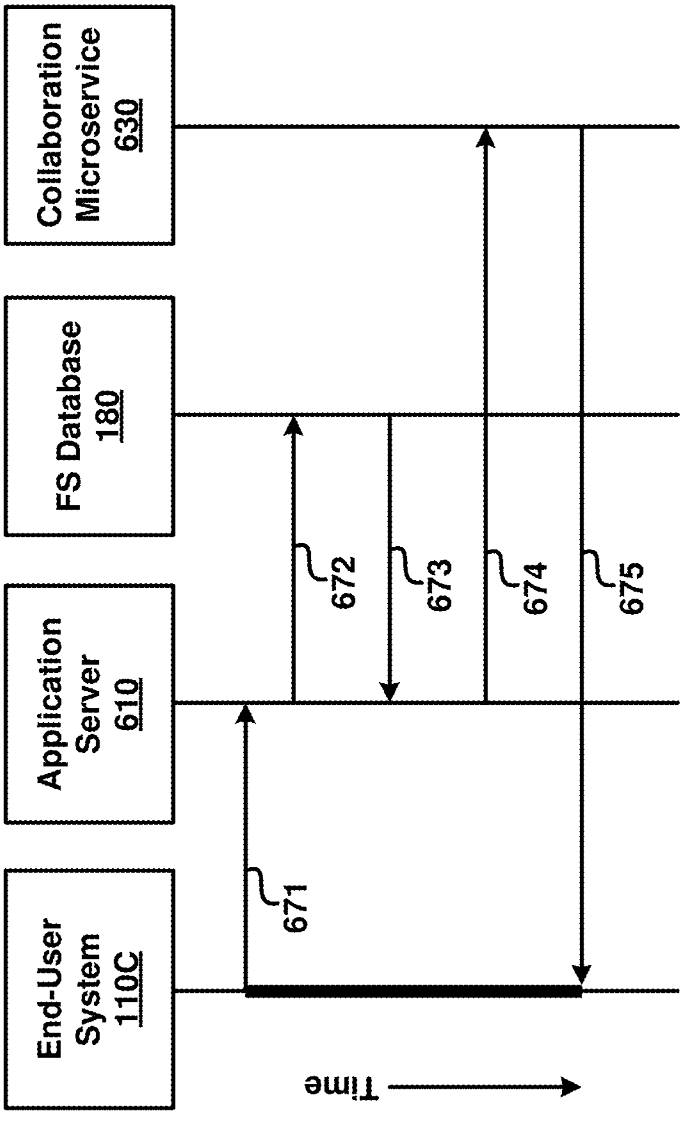
FIG. 6C illustrates the manner in which a list of peer technicians for a given activity is determined in a key based natural learning approach in one embodiment.

FIG. 6C illustrates the manner in which a list of peer technicians for a given activity is determined in a key based natural learning approach in one embodiment. As noted above, in the key based natural learning approach, TDT 150 has already calculated the proficiency of technicians for different activity keys. So, at 671, when a new peer help request comes for an activity, application server 610 first uses the activity and resource properties to create an activity key for the received activity. (For example, if the key is configured as Activity Type, value of activity type for this activity will be used as key) At 672, application server 610 sends a request containing the activity key to FS database 180, which in turn uses the activity key to search a Technician Proficiency table storing the activity keys against combinations of technicians and proficiency scores. All the technicians who having a proficiency score above a configured threshold for the specific activity key are selected and sent back at 673. Application server 610 may perform additional filtering (noted above) and at 674, send the filtered list of technicians to collaboration microservice 630 (chat service), which in turn, creates (at 675) a group chat with all the identified technicians and the technician who was seeking help. The initiating technician can chat and get his/her query cleared.

Thus, TDT 150 enables technicians to request peer help from other technicians in the performance of a desired activity. The description is continued with the manner in which TDT 150 facilitates requesting in-person assistance according to an aspect of the present disclosure.

7. Requesting In-Person Assistance

If the initiating technician still needs help, he/she may request for In-Person Assistance. TDT 150 then identifies the best technicians, from the above filtered set of technicians, who can provide in person assistance. The best technicians may be identified based on the following conditions:

the proximity of the technicians to the activity location.
the amount of idle time available in the route of the technicians
technicians who have worked on the given asset before.

It may be noted that the proximity may be calculated using GPS (Global Positioning System) coordinates of the technician and the activity where assistance is required.

In one embodiment, TDT 150 divides the identified technicians into two sets—Set 1 having the best technicians i.e. who are having the best params (proximity, idle time, proficiency, and who have worked on the given asset before) and Set 2 having the remaining technicians from the filtered list. The manner in which the two sets of technicians are used in the processing of an in-person assistance request is described in detail below.

Figure 7:
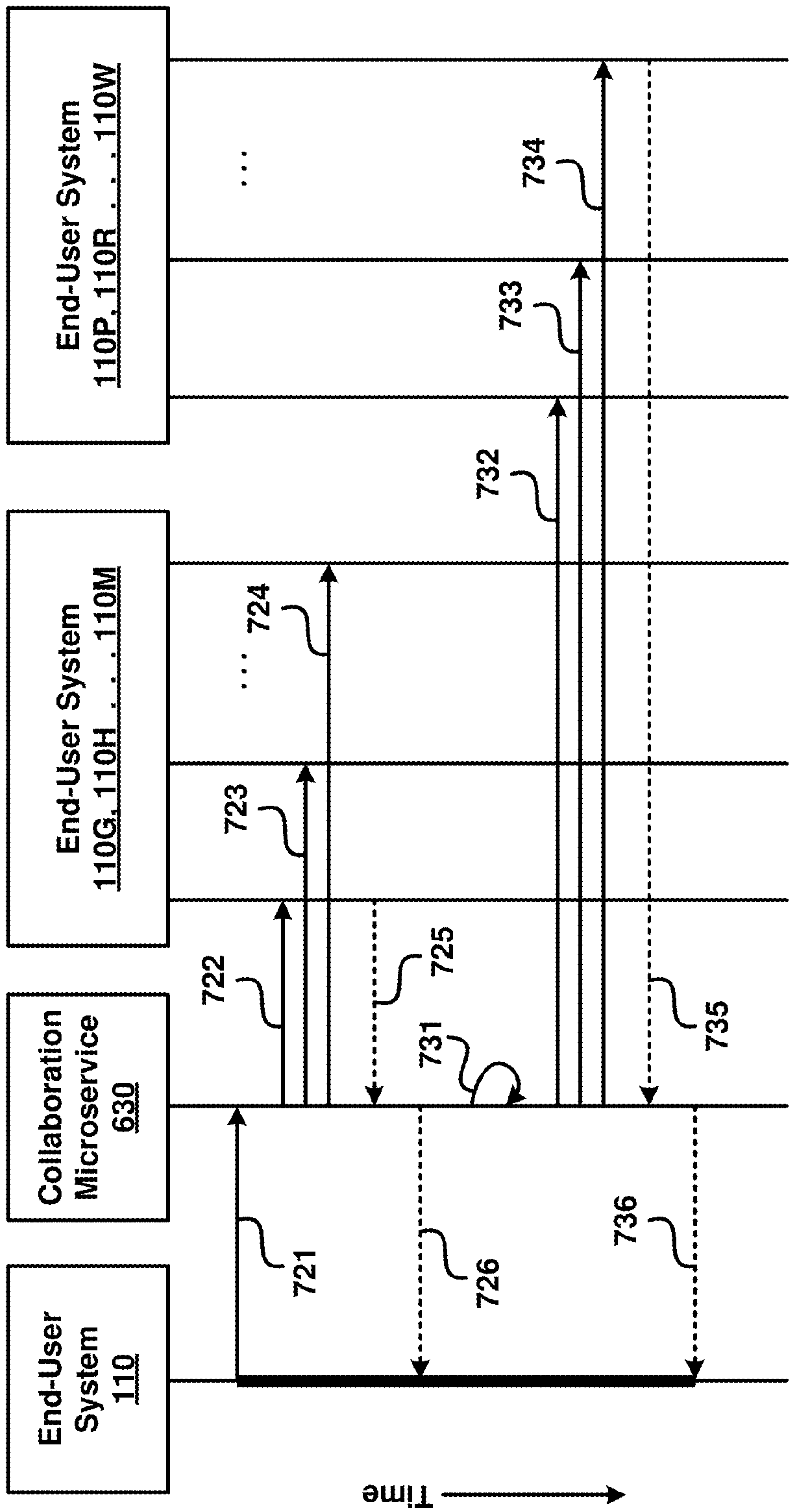
FIG. 7 illustrates the manner in which a request for in-person assistance is processed in one embodiment.

FIG. 7 illustrates the manner in which a request for in-person assistance is processed in one embodiment. At 721, an in-person assistance request for a given activity is initiated by a technician using end-user system 110C to collaboration microservice 630. At 722 to 724, collaboration microservice 630 sends an assist request to each technician in Set 1 noted above. Specifically, the assist requests are sent to the corresponding end-user systems used by the Set 1 technicians. In one embodiment, each assist request has the following details:

Details of the Activity for which assistance is required
Specific query entered by the initiating technician
Location of the activity
Estimated time to complete work along with to and from travel.
Available idle time in route
Accept and Reject Button If any of the technicians in Set 1 accepts the assist request, an acceptance indication is received by collaboration microservice 630 at 725, and accordingly at 726, TDT 150 forwards the acceptance to the initiating technician. In addition, in response to the acceptance, collaboration microservice 630 may cancel the assist requests sent to the other technicians and create a new assisting activity for that technician who accepted the request.

At 731, collaboration microservice 630 waits for a pre-configured duration (e.g., 1 minute) for receipt of acceptance indication from any of the end-user systems 110 used by Set 1 technicians. If no technician accepts (that is no acceptance indication is received), at 732 to 734, collaboration microservice 630 sends an assist request to each technician in Set 2 noted above and waits for someone from Set 2 to accept. If any technician from Set 2 accepts (at 735), collaboration microservice 630 performs the actions noted above including forwarding the acceptance to the initiating technician (at 735).

It may be noted that the concept of splitting the technicians into 2 sets is that, it is desirable that a more competent technician from the best set of technicians (Set 1) accept the assist request instead of any technician. Accordingly, the assist requests are sent first to Set 1 technicians, and after waiting for some time to get an acceptance, are sent to Set 2 technicians.

After accepting an assist request, the assisting technician travels to the activity site and complete the work along with the initiating technician. For the initiating technician, the details of the technician who has accepted the assist request may be displayed, along with that an expected arrival time of the assisting technician.

Thus, technicians are enabled to request in-person assistance from other technicians in the performance of a desired activity. It may be appreciated that the above noted actions of TDT 150 may have associated user interfaces that may be displayed on display units associated with end-user systems 110. Some sample user interfaces that may be provided by TDT 150 to facilitate peer help and in-person assistance in field services are described below with examples.

8. Sample User Interfaces

FIGS. 8A-8H illustrate sample user interfaces that facilitate peer help and in-person assistance in field services in one embodiment. Display area 800 represents a portion of a user interface displayed on a display unit (not shown) associated with one of end-user systems 110. In one embodiment, display area 800 corresponds to a web page rendered by a browser executing on the end-user system. The web pages may be provided by TDT 150 and/or collaboration microservice 630 in response to a user (e.g., technician) sending appropriate requests (for example, by specifying corresponding Uniform Resource Locator (URL) in an address bar) using the browser.

Figure 8A:
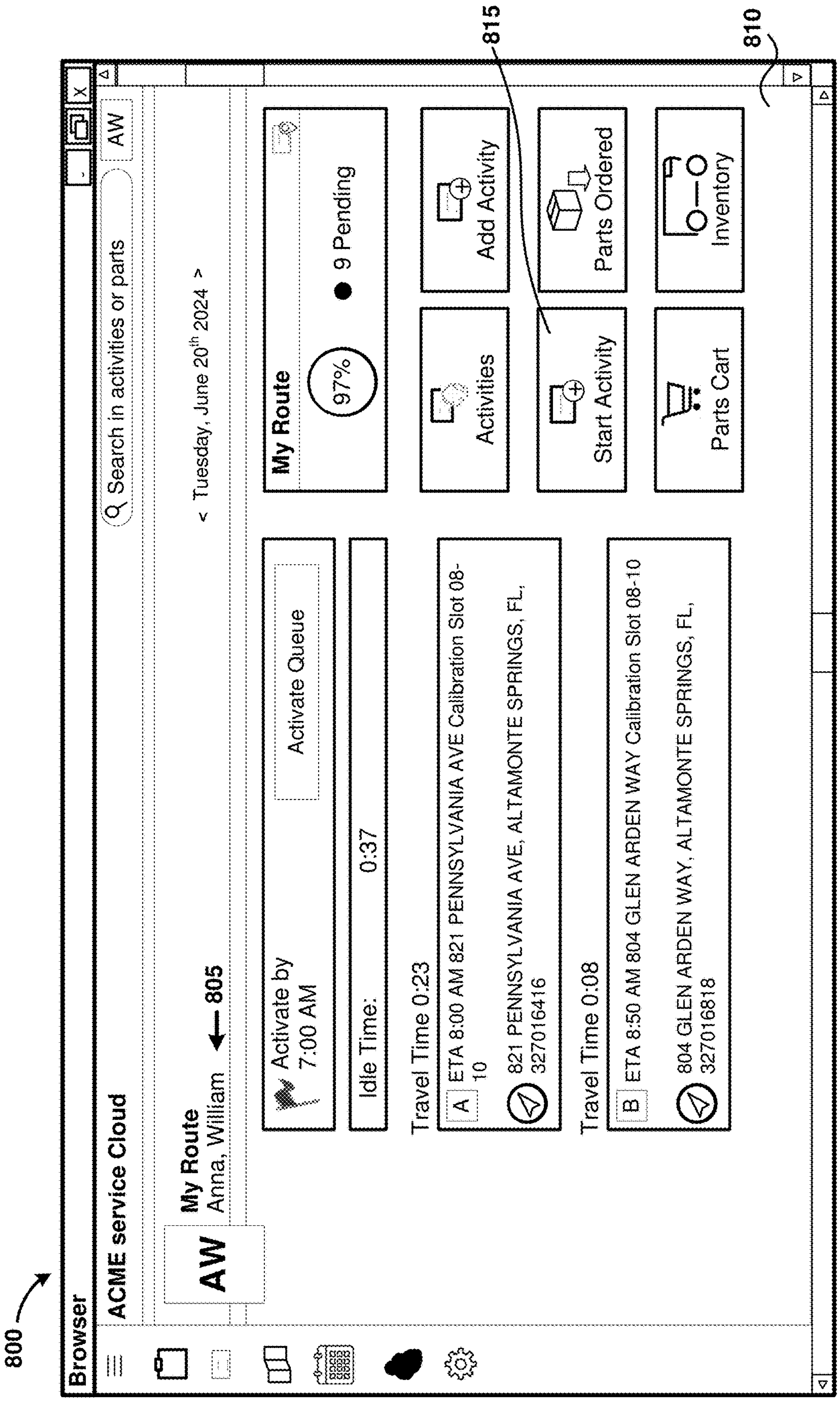
FIGS. 8A-8H illustrate sample user interfaces that facilitate peer help and in-person assistance in field services in one embodiment.

Referring to FIG. 8A, display area 810 depicts a dashboard displayed to a technician (named "Anna, William" as indicated by display area 805). The dashboard enables the technician to view a list of activities assigned to the technician, select a next/desired activity to be performed and start the selected activity by selecting button/display area 815.

Figure 8B:
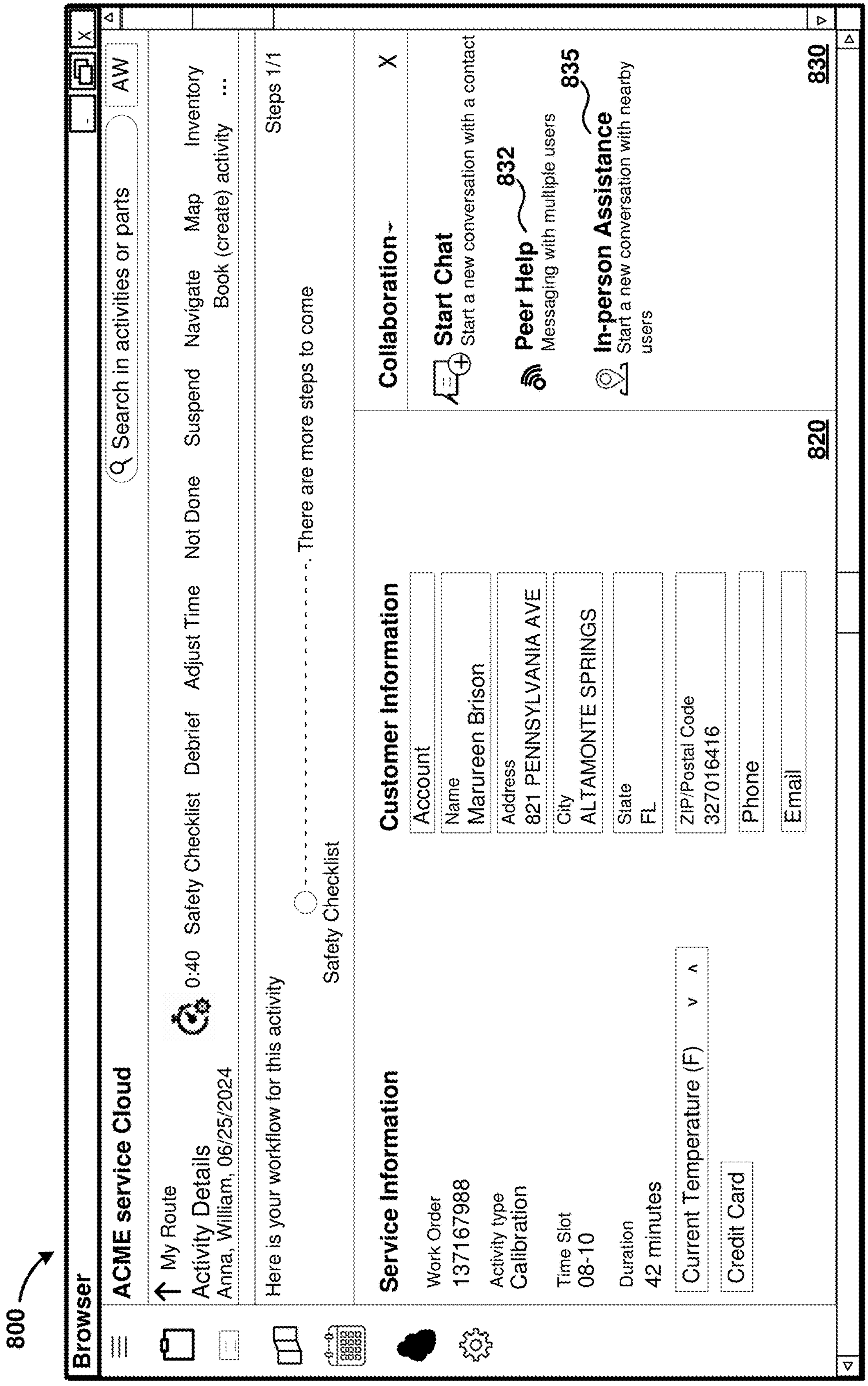

Referring to FIG. 8B, display area 820 depicts the details of a current activity started and being performed by the technician. Upon the technician (Anna) determining that she needs help with the current activity, she may select/click a collaboration the tool icon shown is the left bar to cause display area 830 to be displayed. The collaboration display area 830 includes a "Peer Help" option (display area 832) and an "In-person Assistance" option (display area 835). The description is continued assuming that the technician Anna has selected/clicked display area 832 to initiate a peer help request to TDT 150.

Figure 8C:
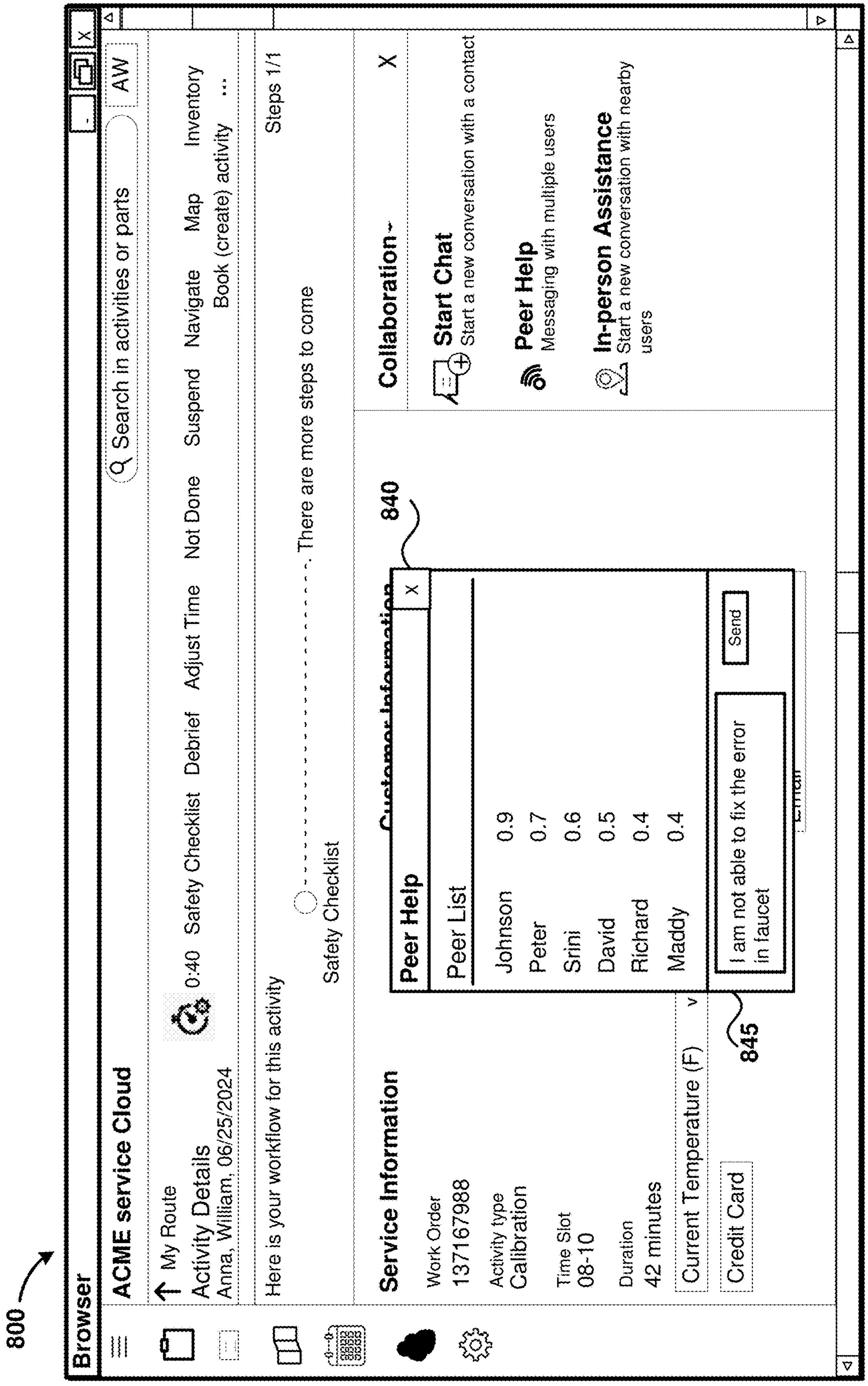

Referring to FIG. 8C, display area 840 depicts a peer help window displayed in response to a technician selecting/clicking option 832 in FIG. 8B. The peer help window displays a list of peer technicians and their corresponding proficiency scores (it is assumed here that the proficiency threshold is 0.4) determined based on the current activity that Anna is working on. Using display area 845, the initiating technician may type/enter any desired query and click on "Send" button there, to cause TDT 150 to initiate a group chat with the peer technicians.

Figure 8D:
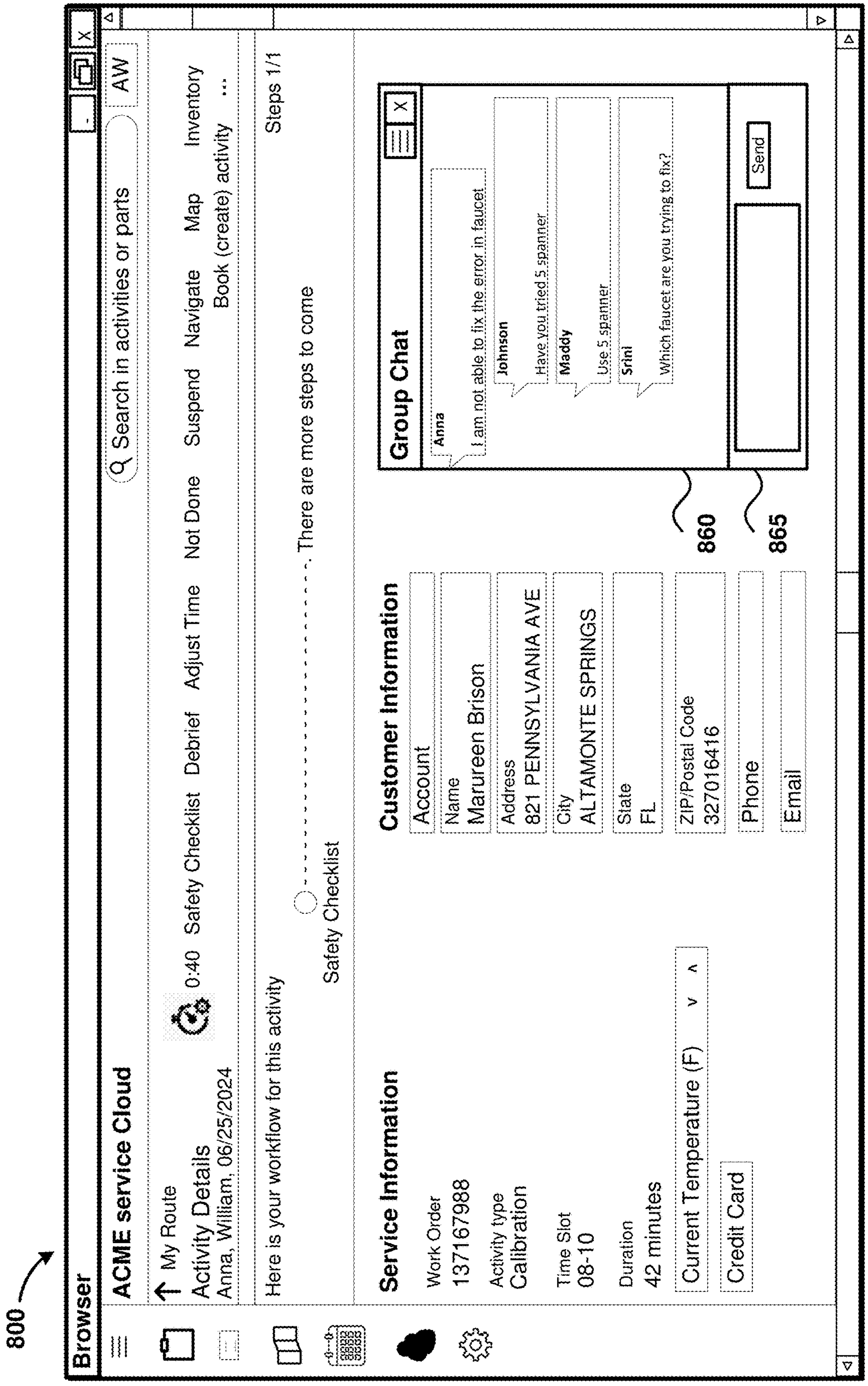

Referring to FIG. 8D, display area 860 depicts a group chat created with the initiating technician Anna and the list of peer technicians shown in display area 840 of FIG. 8C. Display area 860 depicts various messages sent by the other peer technicians in response to the query raised by the initiating technician Anna using display area 845. The initiating technician may thereafter use display area 865 to ask additional queries to the peer technicians.

Figure 8E:
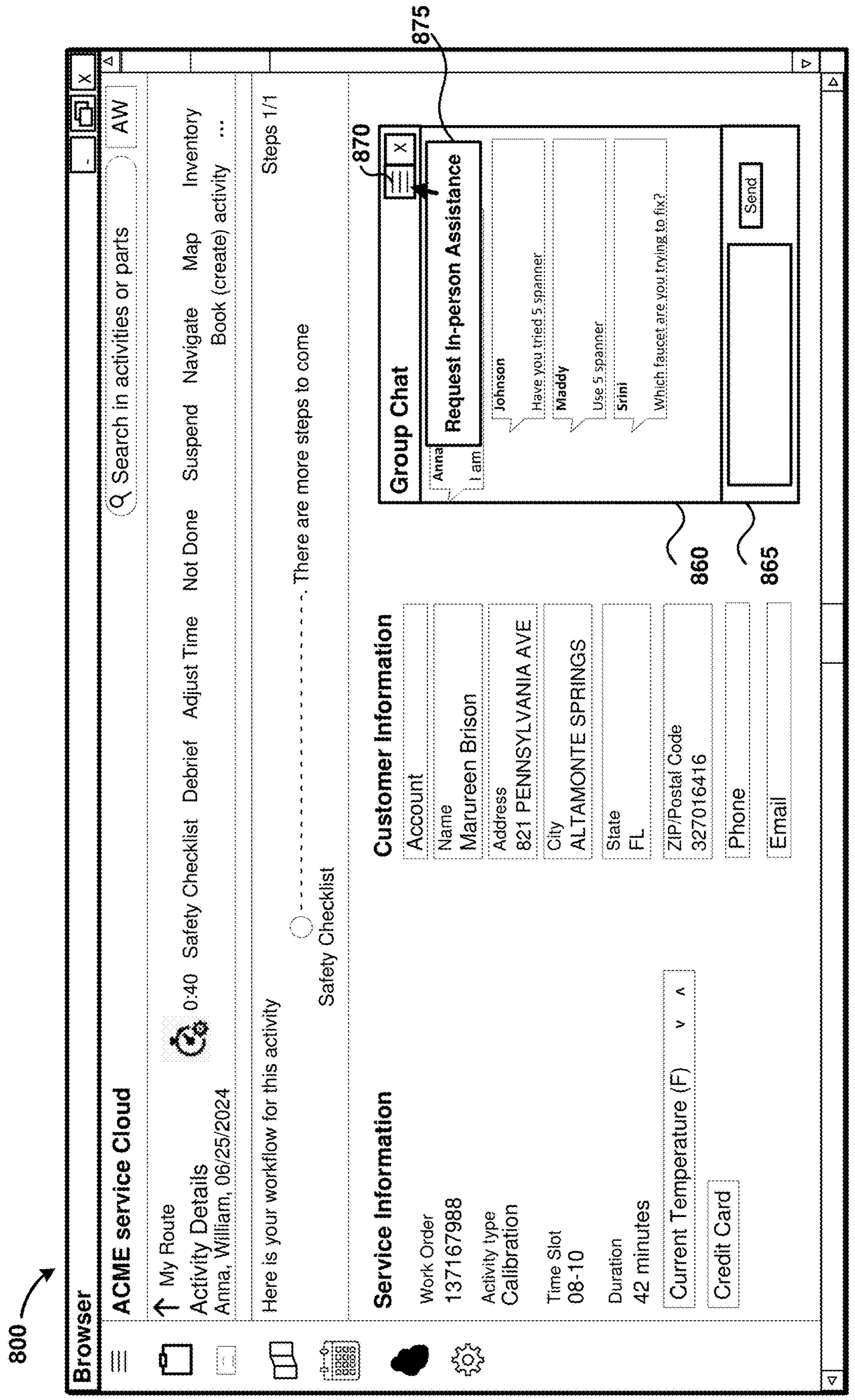

Referring to FIG. 8E, display area 870 depicts an options button that the initiating technician can select/click to view the options available at any time during the group chat. It may be appreciated that the options displayed include "Request In-person Assistance" option 875, which upon selection by the technician causes an in-person assistance request to be sent to TDT 150. It may be appreciated that the below described interfaces may also be provided upon the initiating technician (Anna) selecting/clicking option 835 in FIG. 8B.

Figure 8F:
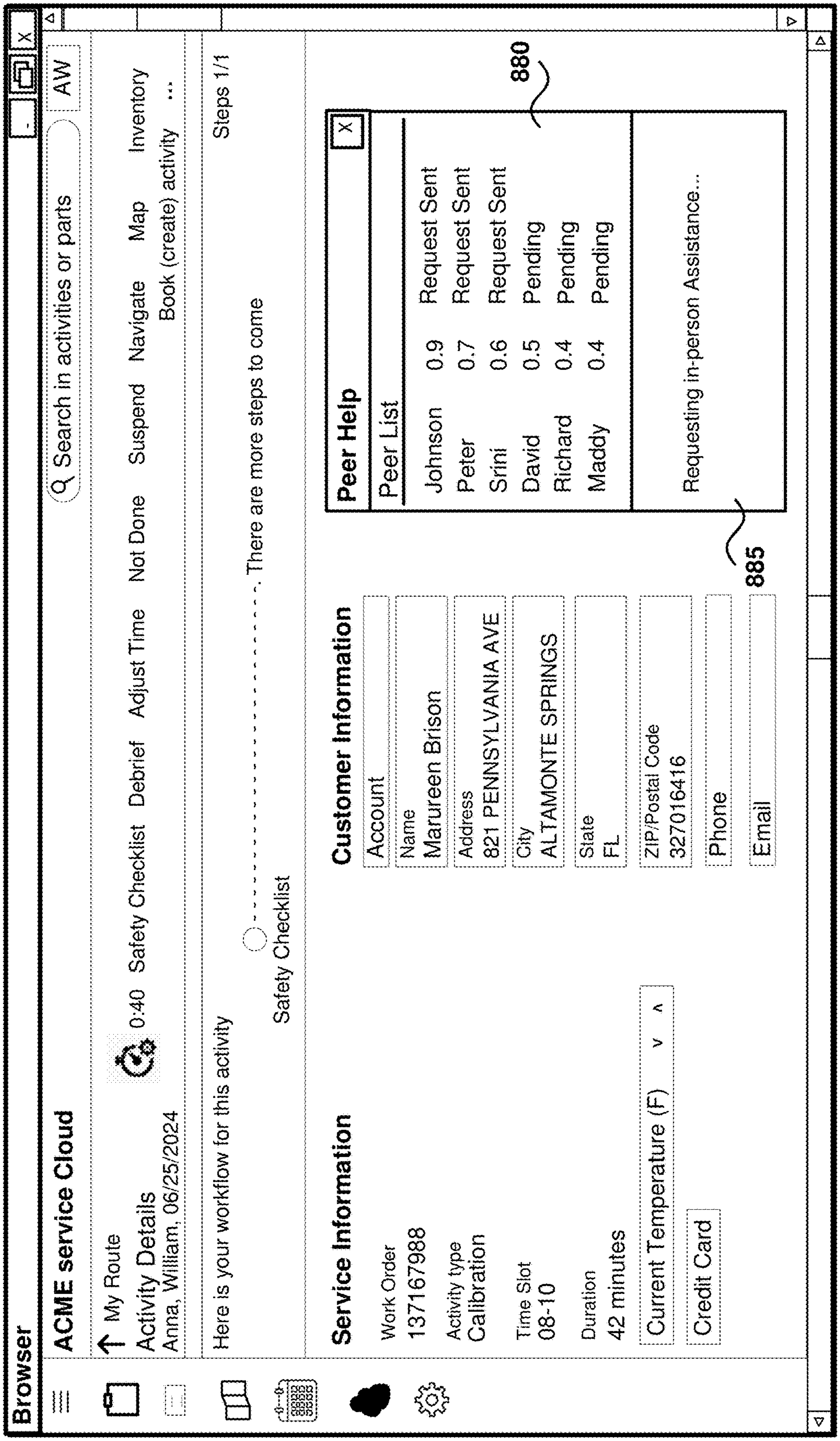

Referring to FIG. 8F, display area 880 depicts the peer help window (noted above) updated to show the status of an in-person assistance request. Specifically, display area 880 indicates that assist requests have been sent to the top 3 (Set 1) technicians as indicated by the text "Request Sent" against their names, and the collaboration service (630) is waiting for acceptance from these technicians. The other technicians have the text "Pending" indicating that the assist requests are to be sent later (as part of sending to Set 2 technicians). Display area 885 accordingly indicates that the current status of "Requesting In-Person Assistance . . . "

Figure 8G:
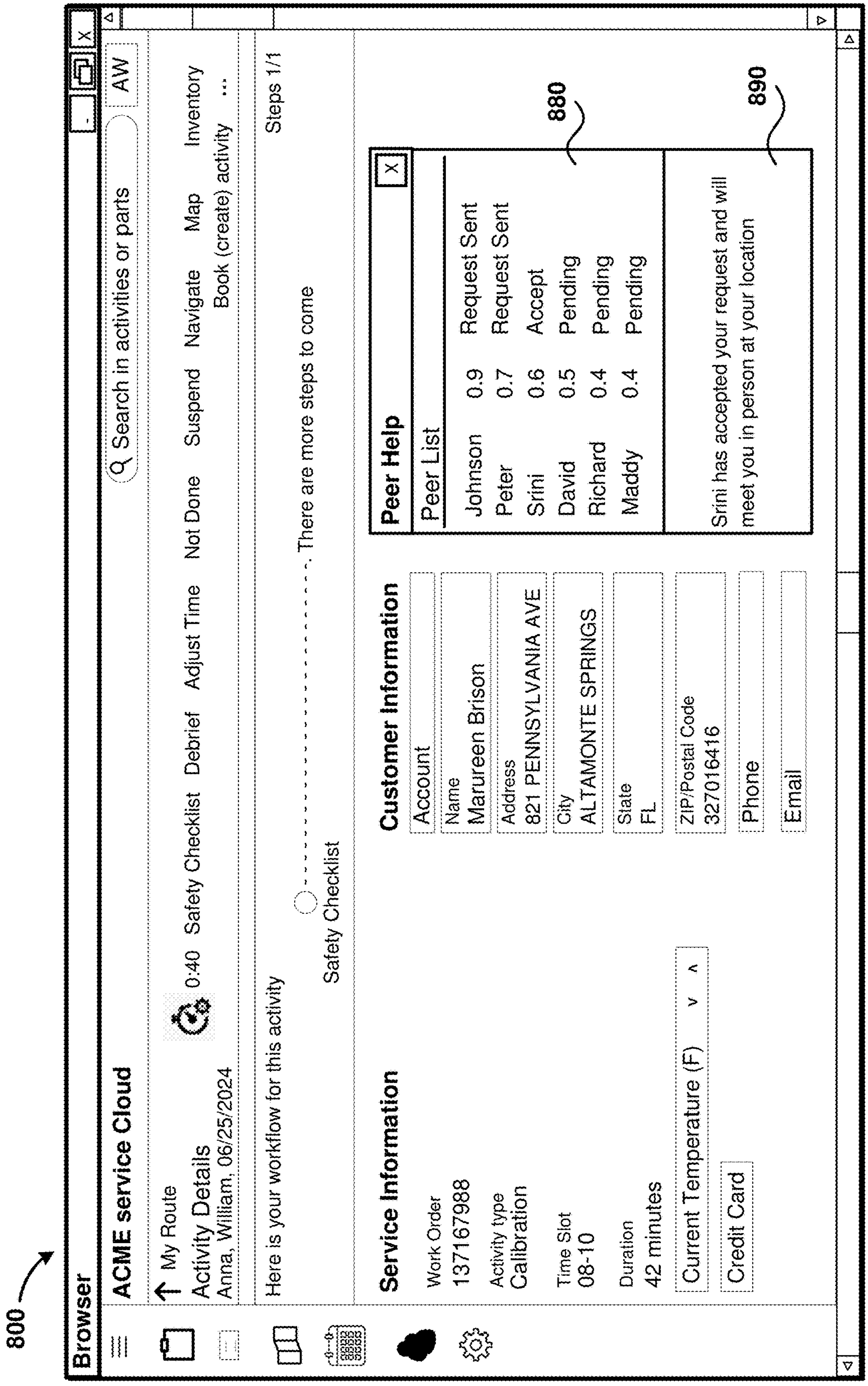

Referring to FIG. 8G, display area 880 depicts the peer help window updated to indicate that a technician (here "Srini") has accepted the assist request. As such, display area 890 indicates the accepted technician will be meeting the initiating technician in person.

Figure 8H:
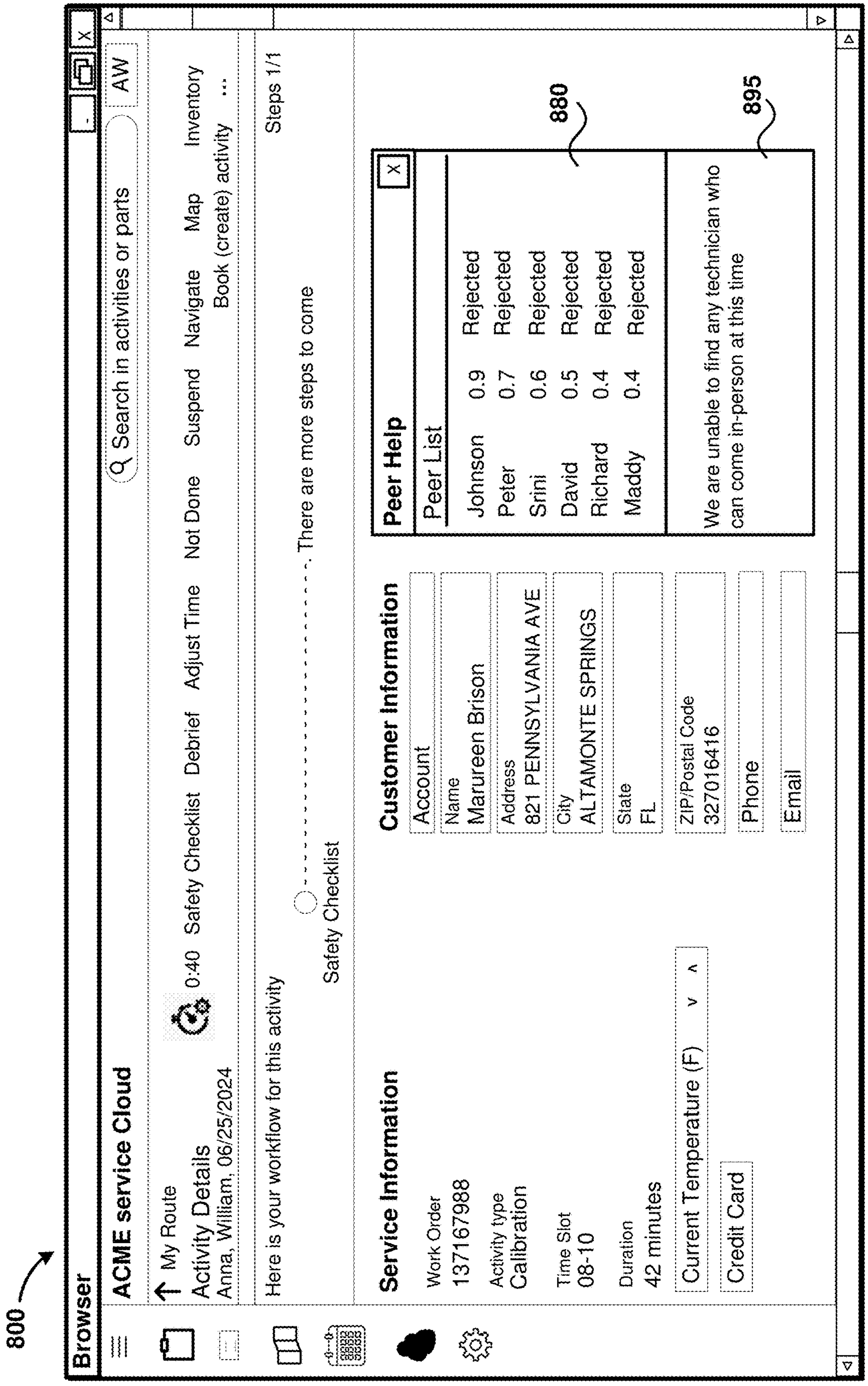

Referring to FIG. 8H, display area 880 depicts the peer help window updated to indicate that none of the technicians has accepted the assist requests (as indicated by the text "Rejected"). As such, display area 895 indicates the collaboration tool is unable to find any technician who can come in person at the current time.

It should be further appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 9:
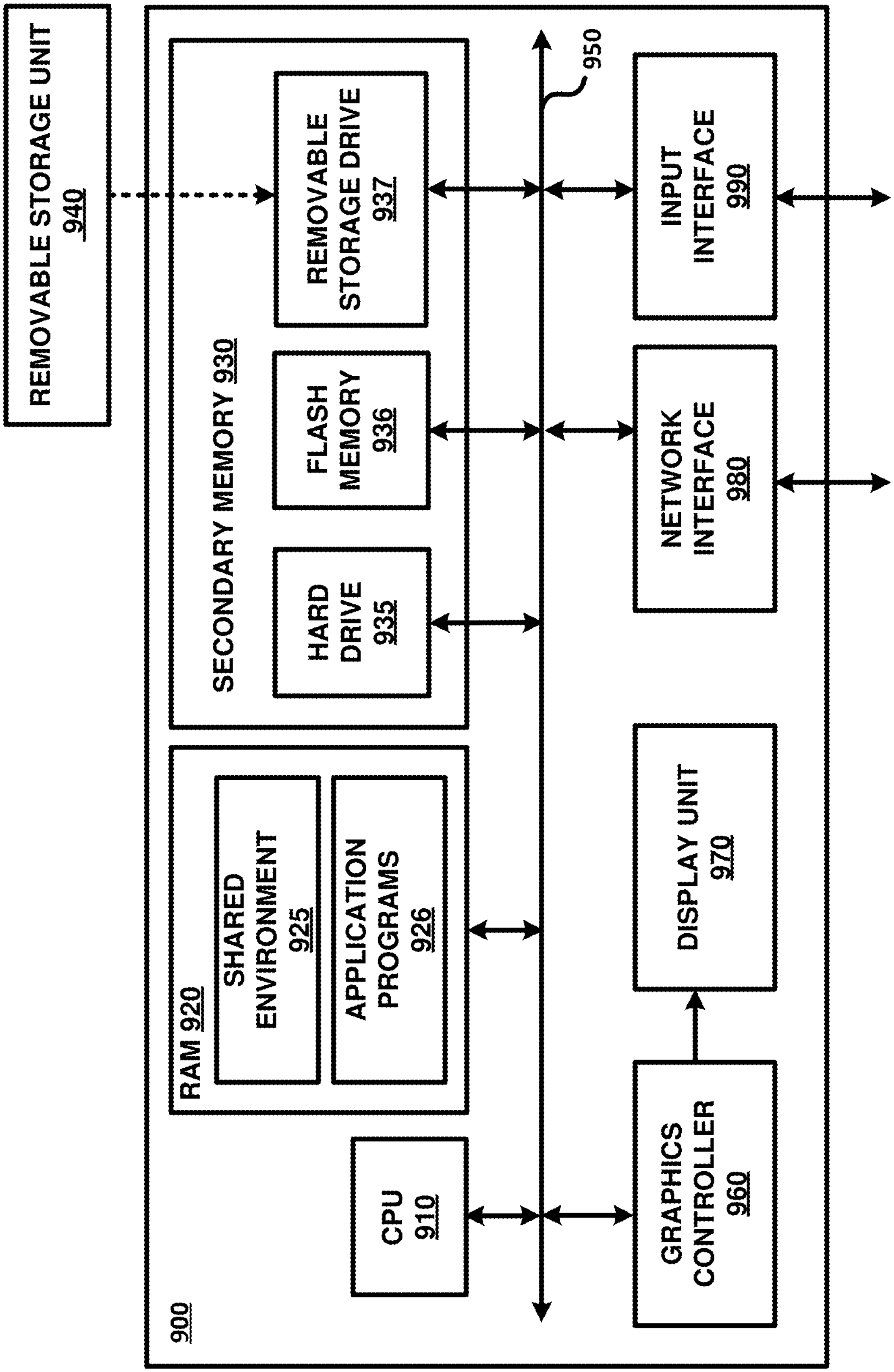
FIG. 9 is a block diagram illustrating the details of a digital processing system in which various aspects of the present disclosure are operative by execution of appropriate In the drawings, like reference numbers generally indicate identical, functionally similar, and/or structurally similar elements. The drawing in which an element first appears is indicated by the leftmost digit(s) in the corresponding reference number.

FIG. 9 is a block diagram illustrating the details of a digital processing system in which various aspects of the present disclosure are operative by execution of appropriate executable modules. Digital processing system 900 may correspond to technician determination tool 150 or any system implementing technician determination tool 150.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (such as other applications, DBMS, etc.). In addition to shared environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals (e.g. portions of the user interfaces shown in FIGS. 8A-8H). Input interface 990 may correspond to a keyboard and a pointing device (e.g., touch-pad, mouse) and may be used to provide inputs (e.g. as required by the user interfaces shown in FIGS. 8A-8H). Network interface 980 provides connectivity to a network (e.g., using Internet Protocol), and may be used to communicate with other systems connected to the networks.

Secondary memory 930 may contain hard drive 935, flash memory 936, and removable storage drive 937. Secondary memory 930 may store the data (e.g., data portions shown in FIGS. 4A-4B, 5 and 6B) and software instructions (e.g., for performing the actions of FIGS. 2, 6A, 6C and 7, for implementing the blocks of FIG. 3), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions forming a technological collaboration tool facilitating support in field services, wherein execution of said one or more instructions by one or more processors contained in a digital processing system cause said digital processing system to perform the actions of:

obtaining a training data comprising characteristics of a plurality of technicians and characteristics of activities completed by each technician in resolving prior issues;

training a machine learning (ML) model based on said training data, said ML model thereafter operable to determine a proficiency level of technicians in helping with a given activity;

receiving, from a technician, a request for help with an activity, said technician being contained in said plurality of technicians;

determining, based on said ML model and said activity, a set of technicians capable of helping with said activity, said set of technicians being contained in said plurality of technicians; and sending, by said digital processing system, a group chat request to a collaboration service, said group chat request specifying said technician and said set of technicians, wherein said collaboration service creates a group chat including said technician and said set of technicians in response to said group chat request, wherein said group chat is provided as a response to said request for help from said technician.

2. The non-transitory machine-readable medium of claim 1, wherein said ML model employs a regression ML approach, wherein said determining comprises:

applying said ML model to said activity to identify for each technician of said plurality of technicians, a proficiency score indicating said proficiency level of the technician in helping with said activity; and including technicians having said proficiency score above a threshold in said set of technicians.

3. The non-transitory machine-readable medium of claim 2, wherein said characteristics of each technician includes one or more of a work skill of the technician, a work zone where the technician works, a list of activity types for recent activities completed by the technician and corresponding counts, a list of work skills used for the recent activities and corresponding counts, and a list of work zones for the recent activities and corresponding counts, wherein said characteristics of each activity includes one or more of an activity type, an activity work skill specifying work skills required to perform the activity, an activity work zone specifying a work zone where the activity is to be performed, a customer associated with the activity, an inventory list specifying the inventories associated with the activity and activity description keywords extracted from a description of the activity.

4. The non-transitory machine-readable medium of claim 1, wherein said ML model employs a key based natural learning approach, further comprising one or more instructions for:

calculating, after said training by using said ML model, a proficiency score for each technician of said plurality of technicians, indicating said proficiency level of the technician in helping with a corresponding activity; and storing, in a data store, said corresponding activity against a combination of said technician and said proficiency score, wherein said determining comprises:

retrieving from said data store, a set of combinations stored corresponding to said activity; and identifying a subset of combinations having said proficiency score above a threshold, wherein said set of technicians comprise the technicians in said subset of combinations.

5. The non-transitory machine-readable medium of claim 1, further comprising one or more instructions for:

receiving a second request for in-person assistance for said activity;

identifying a first subset of technicians contained in said set of technicians capable of providing the in-person assistance; and sending an in-person assistance request to each technician of said first subset of technicians;

checking, for a preconfigured duration, whether an acceptance to said in-person assistance request has been received from any of said first subset of technicians; and if no acceptance has been received in said pre-configured duration:

identifying a second subset of technician contained in said set of technicians capable of providing the in-person assistance; and sending said in-person assistance request to each technician of said second subset of technicians, wherein receipt of said acceptance from any of said first subset of technicians and said second subset of technicians is forwarded as a response to said second request.

6. The non-transitory machine-readable medium of claim 5, wherein said in-person assistance request contains details of said activity, a specific query entered by said technician, a location of said activity, an estimated time to complete work along with to and from travel, an available idle time in route, and an accept button to indicate acceptance, and a reject button to indicate non-acceptance.

7. A method for facilitating support in field services, said method comprising:

obtaining a training data comprising characteristics of a plurality of technicians and characteristics of activities completed by each technician in resolving prior issues;

training a machine learning (ML) model based on said training data, said ML model thereafter operable to determine a proficiency level of technicians in helping with a given activity;

receiving, from a technician, a request for in-person assistance with an activity, said technician being contained in said plurality of technicians;

determining, based on said ML model and said activity, a set of technicians capable of helping with said activity, said set of technicians being contained in said plurality of technicians;

identifying a first subset of technicians contained in said set of technicians capable of providing the in-person assistance; and sending an in-person assistance request to each technician of said first subset of technicians;

checking, for a preconfigured duration, whether an acceptance to said in-person assistance request has been received from any of said first subset of technicians; and if no acceptance has been received in said pre-configured duration:

identifying a second subset of technician contained in said set of technicians capable of providing the in-person assistance; and sending said in-person assistance request to each technician of said second subset of technicians, wherein receipt of said acceptance from any of said first subset of technicians and said second subset of technicians is forwarded as a response to said request for in-person assistance received from said technician.

8. The method of claim 7, wherein said ML model employs a regression ML approach, wherein said determining comprises:

applying said ML model to said activity to identify for each technician of said plurality of technicians, a proficiency score indicating said proficiency level of the technician in helping with said activity; and including technicians having said proficiency score above a threshold in said set of technicians.

9. The method of claim 8, wherein said characteristics of each technician includes one or more of a work skill of the technician, a work zone where the technician works, a list of activity types for recent activities completed by the technician and corresponding counts, a list of work skills used for the recent activities and corresponding counts, and a list of work zones for the recent activities and corresponding counts, wherein said characteristics of each activity includes one or more of an activity type, an activity work skill specifying work skills required to perform the activity, an activity work zone specifying a work zone where the activity is to be performed, a customer associated with the activity, an inventory list specifying the inventories associated with the activity and activity description keywords extracted from a description of the activity.

10. The method of claim 7, wherein said ML model employs a key based natural learning approach, said method further comprising:

calculating, after said training by using said ML model, a proficiency score for each technician of said plurality of technicians, indicating said proficiency level of the technician in helping with a corresponding activity; and storing, in a data store, said corresponding activity against a combination of said technician and said proficiency score, wherein said determining comprises:

retrieving from said data store, a set of combinations stored corresponding to said activity; and identifying a subset of combinations having said proficiency score above a threshold, wherein said set of technicians comprise the technicians in said subset of combinations.

11. The method of claim 7, wherein said in-person assistance request contains details of said activity, a specific query entered by said technician, a location of said activity, an estimated time to complete work along with to and from travel, an available idle time in route, and an accept button to indicate acceptance, and a reject button to indicate non-acceptance.

12. A computing infrastructure comprising:

a first node hosting a collaboration service designed to create group chats;

a database storing a training data comprising characteristics of a plurality of technicians and characteristics of activities completed by each technician in resolving prior issues; and a digital processing system comprising:

a random access memory (RAM) to store instructions for facilitating support in field services; and one or more processors to retrieve and execute the instructions, wherein execution of the instructions causes the digital processing system to perform the actions of:

training a machine learning (ML) model based on said training data stored in said database, said ML model thereafter operable to determine a proficiency level of technicians in helping with a given activity;

receiving, from a technician, a request for help with an activity, said technician being contained in said plurality of technicians;

determining, based on said ML model and said activity, a set of technicians capable of helping with said activity, said set of technicians being contained in said plurality of technicians;

checking whether said request is for peer help or in-person assistance; and if said request is for said peer help: sending, by said digital processing system, a group chat request to said collaboration service, said group chat request specifying said technician and said set of technicians, wherein said collaboration service creates a group chat including said technician and said set of technicians in response to said group chat request, wherein said group chat is provided as a response to said request for help from said technician;

if said request is for in-person assistance:

identifying a subset of technicians of said set of technicians who are capable of providing in-person assistance; and sending said request for in-person assistance to each technician of said subset of technicians.

13. The computing infrastructure of claim 12, wherein said ML model employs a regression ML approach, wherein for said determining, said digital processing system performs the actions of:

applying said ML model to said activity to identify for each technician of said plurality of technicians, a proficiency score indicating said proficiency level of the technician in helping with said activity; and including technicians having said proficiency score above a threshold in said set of technicians.

14. The computing infrastructure of claim 13, wherein said characteristics of each technician includes one or more of a work skill of the technician, a work zone where the technician works, a list of activity types for recent activities completed by the technician and corresponding counts, a list of work skills used for the recent activities and corresponding counts, and a list of work zones for the recent activities and corresponding counts, wherein said characteristics of each activity includes one or more of an activity type, an activity work skill specifying work skills required to perform the activity, an activity work zone specifying a work zone where the activity is to be performed, a customer associated with the activity, an inventory list specifying the inventories associated with the activity and activity description keywords extracted from a description of the activity.

15. The computing infrastructure of claim 12, wherein said ML model employs a key based natural learning approach, said digital processing system further performing the actions of:

calculating, after said training by using said ML model, a proficiency score for each technician of said plurality of technicians, indicating said proficiency level of the technician in helping with a corresponding activity; and storing, in a data store, said corresponding activity against a combination of said technician and said proficiency score, wherein for said determining, said digital processing system performs the actions of:

retrieving from said data store, a set of combinations stored corresponding to said activity; and identifying a subset of combinations having said proficiency score above a threshold, wherein said set of technicians comprise said technicians in said subset of combinations.

16. The computing infrastructure of claim 12, wherein said request is for in-person assistance, said digital processing system further performing the actions of:

identifying a first subset of technicians contained in said set of technicians capable of providing the in-person assistance; and sending an in-person assistance request to each technician of said first subset of technicians;

checking, for a preconfigured duration, whether an acceptance to said in-person assistance request has been received from any of said first subset of technicians; and if no acceptance has been received in said pre-configured duration:

identifying a second subset of technician contained in said set of technicians capable of providing the in-person assistance; and sending said in-person assistance request to each technician of said second subset of technicians, wherein said subset of technicians comprises any of said first subset of technicians and said second subset of technicians from whom said acceptance is received.

17. The computing infrastructure of claim 16, wherein said in-person assistance request contains details of said activity, a specific query entered by said technician, a location of said activity, an estimated time to complete work along with to and from travel, an available idle time in route, and an accept button to indicate acceptance, and a reject button to indicate non-acceptance.

* * * * *